July 28, 1964

D. K. BAKER 3,142,268

MANUFACTURE OF BREAD DOUGH

Filed Oct. 24, 1960

INVENTOR
David King Baker

By Watson, Cole, Grindle & Watson
ATTORNEYS

July 28, 1964   D. K. BAKER   3,142,268
MANUFACTURE OF BREAD DOUGH
Filed Oct. 24, 1960   6 Sheets-Sheet 4

July 28, 1964

D. K. BAKER 3,142,268

MANUFACTURE OF BREAD DOUGH

Filed Oct. 24, 1960

INVENTOR
David King Baker
By Watson, Cole, Grindle Watson
ATTORNEYS

July 28, 1964   D. K. BAKER   3,142,268
MANUFACTURE OF BREAD DOUGH
Filed Oct. 24, 1960   6 Sheets-Sheet 6

INVENTOR
David King Baker
By
Watson, Cole, Grindle & Watson
ATTORNEYS

United States Patent Office 3,142,268
Patented July 28, 1964

3,142,268
MANUFACTURE OF BREAD DOUGH
David King Baker, Wansford, Peterborough, England, assignor to Baker Perkins Holdings Limited, Peterborough, England, a British company
Filed Oct. 24, 1960, Ser. No. 64,385
Claims priority, application Great Britain Oct. 27, 1959
5 Claims. (Cl. 107—68)

This invention provides a divider panner which, when supplied with suitable dough, will deliver directly into pans a dough which can be baked into satisfactory loaves after passage through a proofing chamber but without the necessity for the conventional handing up, first proofing and moulding operations.

The conventional dough divider comprises a hopper, a top box beneath the hopper and a division box located at the side of the top box and movable from a top position, in which it is aligned with the top box, to a bottom discharge position. In operation, a knife moves across the bottom of the hopper to cut it off from the top box and a compactor ram moves into the top box to compact the dough therein. When the division box has moved up into register with the top box, the compactor ram continues its movement to deliver the compacted dough into the division box. This contains a freely slidable ejector ram which is pushed back by the entering dough until it is arrested by an external weight regulating bar. The division box is then moved down, the knife and the compactor ram return to their original positions and a discharge bar moves the ejector ram forward to discharge a lump of dough from the division box onto a conveyor beneath it.

The divider normally delivers a single lump of dough at each cycle of operation, but occasionally the division box has been divided by partitions into a number of pockets, each containing an individual ejector ram, in order to produce at each cycle a number of lumps of dough, aggregating in weight to that of the required loaf, which are separately handled and recombined before the dough is panned. Such partitioned dividers have not hitherto been capable of delivering the dough directly into pans. In a typical example suitable for a 2 lb. loaf (now weighing 28 ozs.), the division box is divided by three partitions, each 1¼″ thick, into four pockets 2¼″ high and 2½″ wide, the stroke of the ejection rams being 2¼″. This divider produces four pieces of dough at each cycle, the overall spacing of which, when they are on the conveyor, is considerably in excess of the length, 9″, of the pan required for a 2 lb. loaf. Direct panning is accordingly impossible and is in any event impossible when the divider is supplied with dough made by the normal straight dough batch method, because the nature of the dough is such that the resulting bread would be too dense, and contain large air holes with unduly thick cell walls.

According to the invention, I achieve direct panning from a divider by feeding continuously a suitable dough (as hereinafter defined) to a divider panner arranged to form simultaneously at each cycle of operation from the incoming supply of dough at least three pieces of dough, each piece of dough being of predetermined weight and the overall length of the pieces of dough not exceeding the length of the baking pan into which the dough is to be deposited, traversing pans in succession past the divider and discharging the requisite number of pieces of dough into each pan. The invention includes a divider panner for use in the manufacture of bread by this process.

By a suitable dough I mean a dough made by a process involving final development of the dough in a stage immediately preceding its delivery to the divider, the dough having been developed by a stretching action in a high speed mixer and having air disposed therein with a considerable degree of uniformity in cells having thin walls. The developed dough may be made in the mixing chamber described in our copending application Serial No. 64,409, filed October 24, 1960, and is delivered to the divider from the mixing chamber without any time delay sufficient to result in substantial further fermentation of the dough. While the dough is discharged from the mixing chamber in lumps following one another in rapid succession, the supply of dough to the divider is, in effect, continuous.

The divider has four or more pockets (in the case of a 2 lb. loaf) or three or more pockets (in the case of a 1 lb. loaf) disposed side by side and in which the individual pieces of dough are formed at an overall spacing less than the length of the interior of the pan. It is desirable that the air cells in a loaf should be aligned and elongated in a direction transverse to the length of the loaf and to attain this desired alignment of the cells with a conventional divider it is necessary to resort to subsequent handing, proving, moulding and cross-panning to obtain a really high class loaf. I find that division of the dough into pieces as described above of itself provides some realignment of the cell structure and that particularly good results, comparable to those obtained by cross-panning, are obtained when the cross-section of the pockets is reduced and their length increased as compared with the pockets in a normal partitioned divider. This is thought to be due to the extrusion effect on the dough as it is forced into and out of such narrow, elongated pockets.

In the case where strapped pans are used, these may be fed through the divider by a continuously moving chain conveyor carrying slats defining a table surface for supporting the pans and travelling in a direction parallel to that of the movement of the ejection plungers, fingers being provided which are periodically lifted to arrest each pan as it comes into position to receive a charge of dough and then lowered to permit the filled pan to be carried away by the conveyor.

If desired, however, the pans may be pushed through the divider on a smooth dead plate up to the fingers, the push being transmitted to each pan by its successor.

Alternatively, in order to achieve the output of dough pieces required, a wide divider may be used in which the dough for two loaves is divided and panned simultaneously, with two rows of strapped pans passing through the divider.

Certain embodiments of the invention will now be described in more detail, by way of example, with reference to the accompanying drawings, in which.

Figure 3:
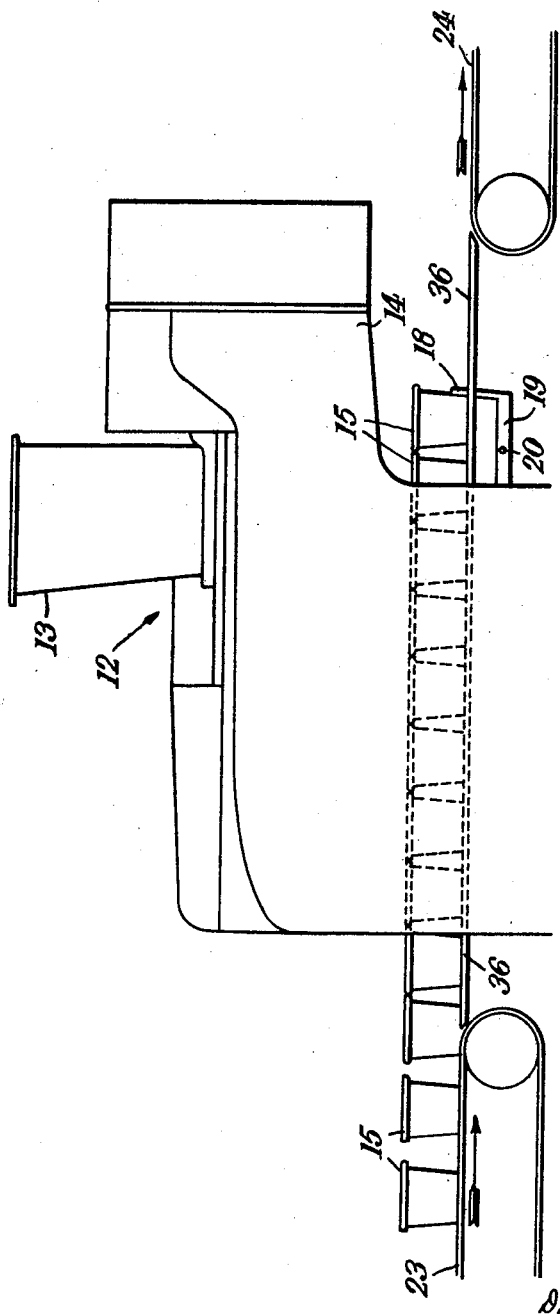
Figure 9A:
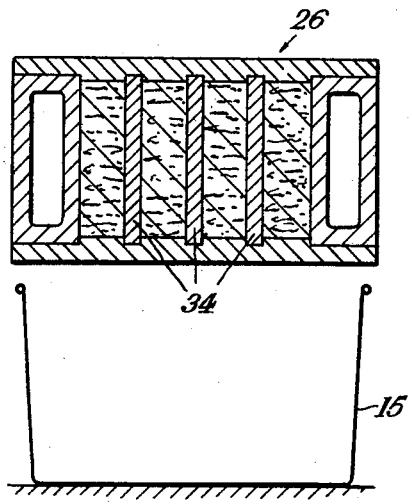
Figure 9B:
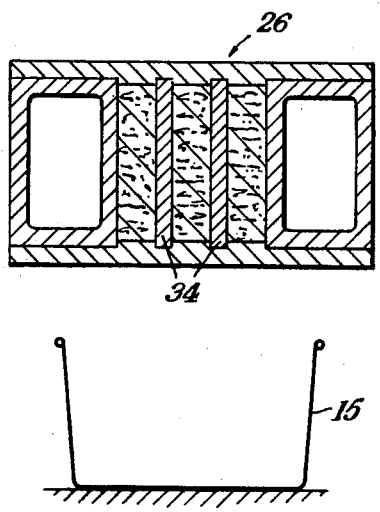
Figure 10A:
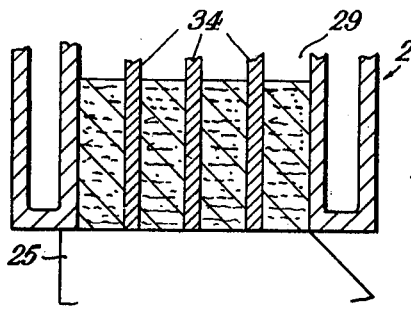
Figure 10B:
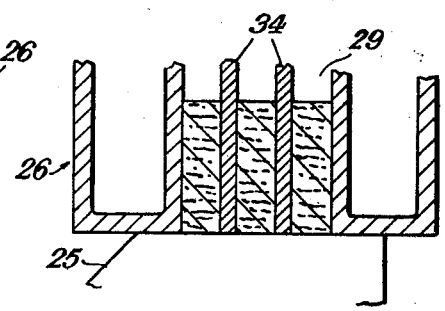
Figure 11:
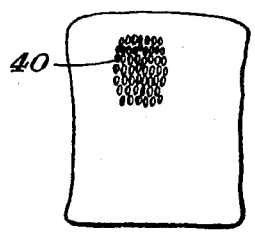

FIG. 3 is a side elevation showing an alternative mechanism for feeding the pans to the divider, FIGS. 4–8 are diagrammatic sectional views illustrating the operation of the divider, FIGS. 9A and 9B are diagrammatic vertical sections through division boxes appropriate for a 28 oz. and a 14 oz. loaf respectively, FIGS. 10A and 10B are corresponding diagrammatic sectional plan views, and FIG. 11 is a diagram illustrating the cell structure of a slice cut from a loaf baked from dough divided and panned in accordance with the invention, Like reference numerals indicate like parts throughout the figures.

Figure 1:
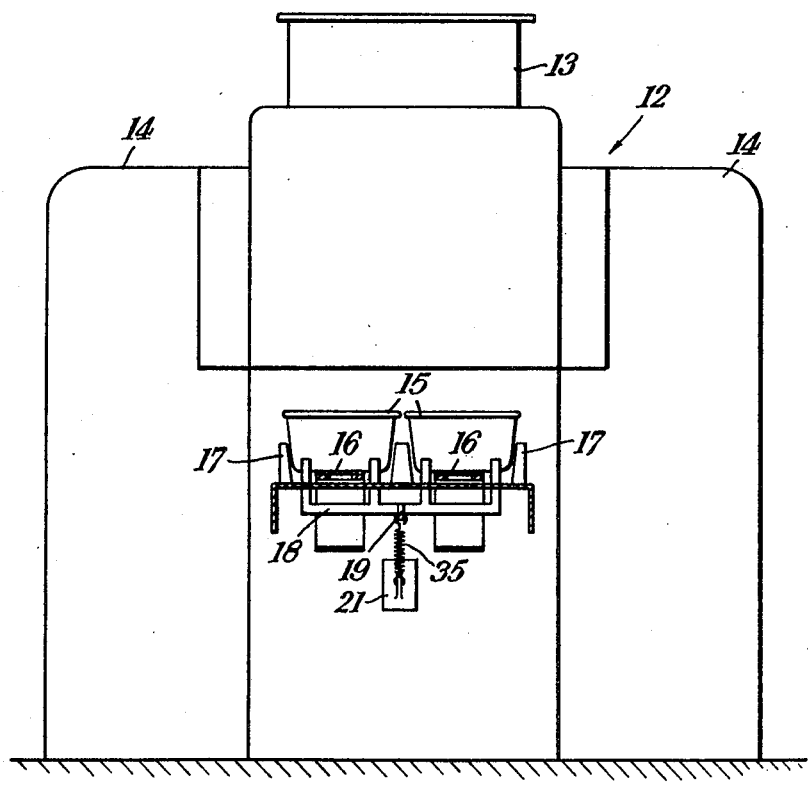
FIG. 1 is a front elevation of a divider panner according to the invention.
Figure 2:
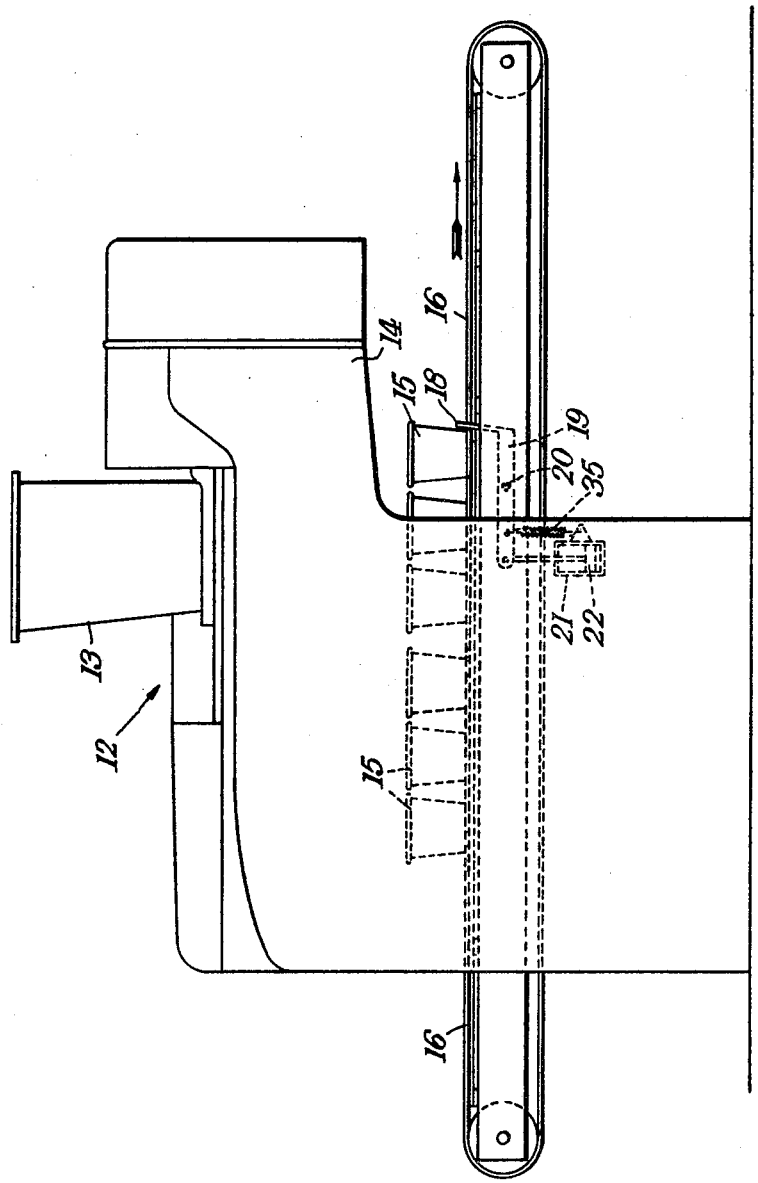
FIG. 2 is a corresponding side elevation.

The divider panner 12, shown in FIGS. 1 and 2, includes a hopper 13 feeding two dividing mechanisms 14, by suitable feed channels, not shown, developed dough being supplied directly to the hopper from a mixing chamber of the kind described in my aforesaid application, Serial No. 64,409, filed October 24, 1960, now Patent No. 3,125,968. At each cycle of operations, each dividing mechanism forms four lumps of dough, in the case of a 28 oz. loaf, or three lumps of dough, in the case of a 14 oz. loaf, these lumps of dough being ejected so, that they fall side by side directly into pans 15 fed in pairs through the divider by a chain conveyor 16 carrying slats which impart a friction drive to the pans. Guides 17 for the pans are shown in FIG. 1. The pans are arrested in pairs beneath the dividing mechanisms by fingers 18, carried on an arm 19 pivoted at 20 and biased by a spring 35 into the stop position shown in FIG. 2. Air under pressure is periodically admitted to the lower end of a cylinder 21, causing a piston 22 coupled to the end of the arm 19 to rise, so lowering the fingers 18 and permitting the filled pans to pass on. The pressure is released from the cylinder 21 in time for the fingers 18 to rise to arrest the next pair of pans.

The apparatus shown in FIG. 3 is generally similar, but in this case the pans 15 travel through the divider along a dead plate 36, to which they are fed by a feed conveyor 23 and from which they are removed by a discharge conveyor 24. Apart from the construction of the division box, the dividing mechanisms are conventional and will be only briefly described with reference to FIGS. 4–8. The mechanism includes a top box 25 beneath the hopper 13, a division box 26, which is divided into several compartments as later described, a knife 27, a compactor ram 28 and an ejector ram 29 which is formed with slots to accommodate the partitions in the division box.

Figure 4:
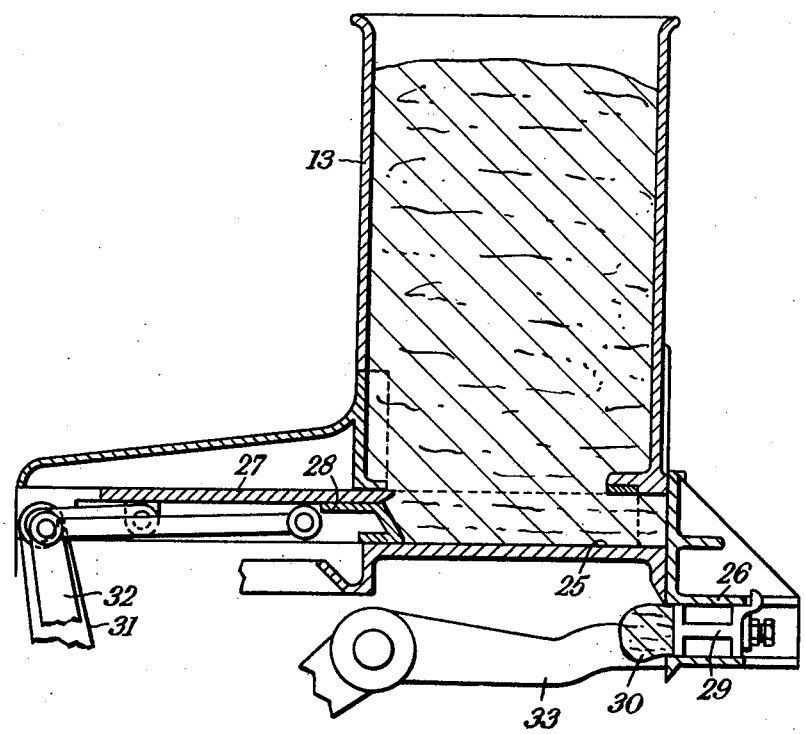
Figure 5:
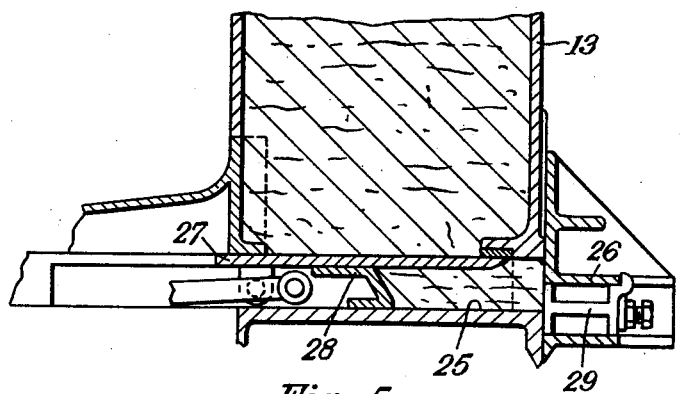
Figure 6:
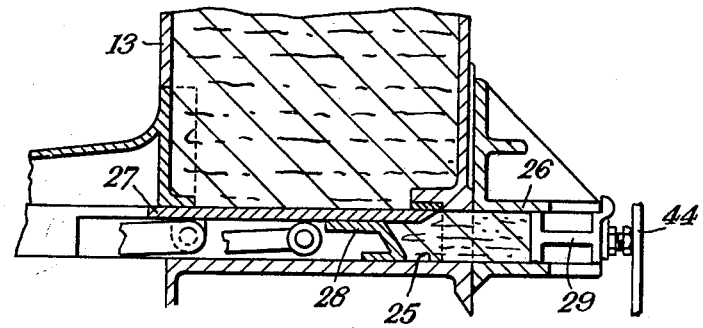
Figure 7:
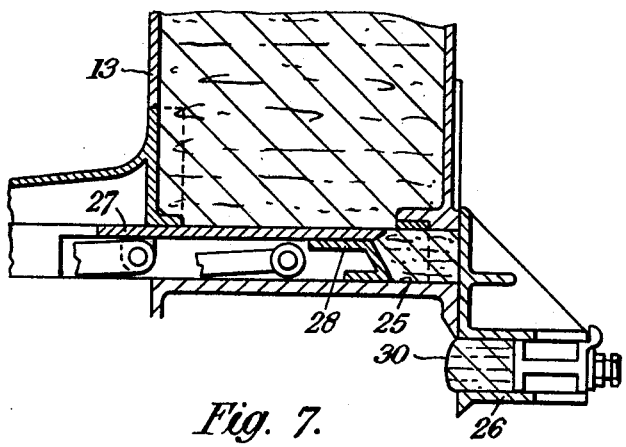
Figure 8:
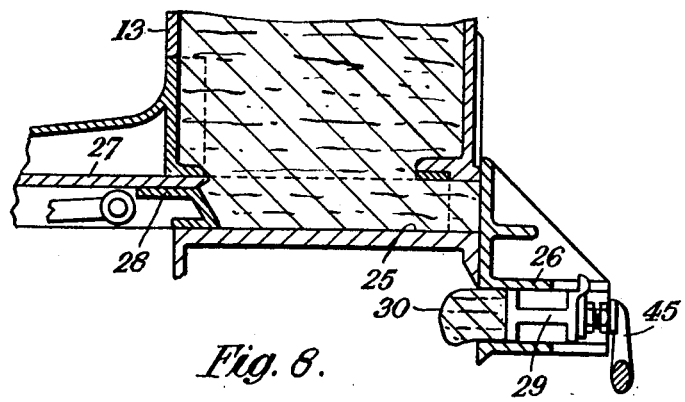

At the start of the cycle, the parts occupy the position shown in FIG. 4, in which the division box 26 is below the top box 25 and the lumps of dough 30 have been just discharged from the division box and are about to fall into a pan. Starting from this position, the knife 27 is moved across by a cam operated lever 31, as shown in FIG. 5, to cut off the hopper 13 from the top box 25 and the ram 28 is simultaneously moved in by a cam operated lever 32 to compact the dough in the top box 25. Simultaneously the division box 26 is being raised by a cam operated lever 33. When, as shown in FIG. 6, the division box 26 is aligned with the top box 25, further advance of the ram 28 delivers compacted dough into the division box 26, moving the ram 29 outwardly until it is arrested by a weight regulating bar 44. The division box 26 then descends, as shown in FIG. 7, and the knife 27 and ram 28 commence their return stroke. When the division box has reached its bottom position, FIG. 8, a cam operated discharge bar 45 imparts a positive stroke to the ram 29 to eject the pieces of dough from the division box.

As shown in FIGS. 9A and 10A, in the case of a 28 oz. loaf, the divider is arranged to scale off 32 oz. of dough in each division box to allow for evaporation on baking and performs 11¼ strokes per minute. Each division box is divided by three partitions 34, each ⅜" wide, into four pockets, each 3" deep and 1³²⁄₃₂" wide. The stroke of the ejector ram 29 is 3⁹⁄₁₆". As the four ejected pieces of dough are separated by narrow partitions 34 they tend to join up on leaving the division box and to fall into the pan together. In the case of a 14 oz. loaf, as shown in FIGS. 9B and 10B, the divider is arranged to scale off 16 oz. of dough in each division box and performs 11¼ strokes per minute. Each division box is divided by two partitions 34, each ⅜" wide, into three pockets, each 3" deep and ⅞" wide. The stroke of the ejector ram 29 is 3¼". In both cases the overall spacing of the lumps of dough ejected from the division box is less than the length of the pan 15.

The shearing action exerted on the dough as it is forced into and out of the narrow pockets of the division box tends to elongate the cells so that in the finished loaf they have the configuration indicated at 40 in FIG. 11 and a slice of the bread has an attractive white appearance. If the partitions are removed from the division box, the cells tend to have a rounded form and a slice of bread baked from the same dough to have a dull grey appearance.

What I claim as my invention and desire to secure by Letters Patent is:

1. A divider panner for use in the manufacture of loaves of bread comprising a top box, a division box located to one side of the top box and movable from a top position in which it is aligned with the top box to a bottom discharge position, said division box having therein at least two thin vertical partitions which divide the division box into pockets situated side by side and each pocket being of uniform rectangular cross section and having a depth considerably exceeding its width, a reciprocating compactor ram, means for actuating said compactor ram to force dough from the top box into the division box to fill the pockets therein when the division box is in its top position, ejector ram means in said division box arranged to move outwardly as dough is forced into the division box by said compactor ram, a weight regulating bar located outside said division box and affective when contacted by said ejector ram means to terminate outward movement thereof, a cam operated discharge bar located below said weight regulating bar for moving said ejector ram means inwardly when the division box is in its bottom discharge position to discharge lumps of dough horizontally from the pockets in said division box in the direction reverse to the direction of entry of dough into the pockets, means for traversing baking pans in succession beneath said division box, and means for arresting said pans in succession in position to receive the pieces of dough discharged from the pockets of the division box and falling directly therefrom into said pans, said pans being of capacity to receive side by side said discharged pieces of dough.

2. A divider panner as claimed in claim 1 for the production of 1 lb. loaves wherein the division box has three partitions dividing it into four pockets 3 inches deep and 1³²⁄₃₂ inches wide, and the stroke of said ejector ram means is 3⁹⁄₁₆ inches.

3. A divider panner as claimed in claim 2, wherein the width of said partitions is ⅜ inch.

4. A divider panner as claimed in claim 1 for the production of 2 lb. loaves, wherein the division box has two partitions dividing it into three pockets each 3 inches deep and ⅞ inch wide and the stroke of said ejector means is 3¼ inches.

5. A divider panner as claimed in claim 4, wherein the width of said partitions is ⅜ inch.

References Cited in the file of this patent

UNITED STATES PATENTS

| | | |
|---|---|---|
| 2,093,466 | Marasso | Sept. 21, 1937 |
| 2,194,107 | Williams | Mar. 19, 1940 |
| 2,253,770 | Duffy | Aug. 26, 1941 |
| 2,280,834 | Kocher | Apr. 28, 1942 |
| 2,342,270 | Harber | Feb. 22, 1944 |
| 2,408,602 | Bowker | Oct. 1, 1946 |
| 2,568,252 | Pointon | Sept. 18, 1951 |
| 2,752,866 | Seem | July 3, 1956 |
| 2,781,732 | Lenherr | Feb. 19, 1957 |